(12) United States Patent
Oh (10) Patent No.: US 11,035,308 B2
(45) Date of Patent: Jun. 15, 2021

(54) EVAPORATION GAS ACTIVE PURGE SYSTEM AND ACTIVE PURGE METHOD

(71) Applicants: Hyundai Motor Company, Seoul (KR); Kia Motors Corporation, Seoul (KR)

(72) Inventor: Young-Kyu Oh, Gwacheon-si (KR)

(73) Assignees: Hyundai Motor Gompany, Seoul (KR); Kia Motors Gorporation, Seoul (KR)

( * ) Notice: Subject to any disclaimer, the term of this patent is extended or adjusted under 35 U.S.C. 154(b) by 0 days.

(21) Appl. No.: 16/680,255

(22) Filed: Nov. 11, 2019

(65) Prior Publication Data

US 2020/0173383 A1 Jun. 4, 2020

(30) Foreign Application Priority Data

Dec. 4, 2018 (KR) ........................ 10-2018-0154405

(51) Int. Cl.
*F02M 25/08* (2006.01)
*F02D 41/00* (2006.01)
(Continued)

(52) U.S. Cl.
CPC ....... *F02D 41/004* (2013.01); *F02D 41/0032* (2013.01); *F02D 41/0042* (2013.01); *F02D 41/0045* (2013.01); *F02D 41/1401* (2013.01); *F02M 25/089* (2013.01); *F02M 25/0836* (2013.01); *F02M 25/0854* (2013.01); *F02M 25/0872* (2013.01); *F02M 26/04* (2016.02); *F02M 26/12* (2016.02); *F02M 26/17* (2016.02); *F02M 35/024* (2013.01); *F02M 35/10144* (2013.01); *F02M 35/10157* (2013.01); *F02M 35/10222* (2013.01); *F02M 35/10386* (2013.01); *G01M 15/09* (2013.01);
(Continued)

(58) Field of Classification Search
CPC ............... F02D 41/0032; F02D 41/004; F02D 41/0042; F02D 41/0045; F02D 2200/501; F02M 25/0836; F02M 25/089; F02M 2025/0845; F02M 26/17
USPC .......................... 701/103; 123/519, 520, 698
See application file for complete search history.

(56) References Cited

U.S. PATENT DOCUMENTS

2002/0035990 A1* 3/2002 Yoshida ............. F02M 25/0809
123/520
2016/0123254 A1* 5/2016 Burleigh ............... F02D 41/004
123/520

(Continued)

FOREIGN PATENT DOCUMENTS

KR 1998-038643 A 8/1998

*Primary Examiner* — Erick R Solis
(74) *Attorney, Agent, or Firm* — Morgan, Lewis & Bockius LLP (57) ABSTRACT

An evaporation gas active purge system may include a purge line of connecting a canister for absorbing an evaporation gas of a fuel tank to an intake pipe; a purge pump mounted on the purge line; a purge valve mounted on the purge line to be disposed between the purge pump and the intake pipe; a pressure sensor mounted on the purge line to be disposed between the purge pump and the purge valve; and a control unit of receiving a signal from the pressure sensor, and transmitting an operating signal to the purge pump and the purge valve, wherein the control unit controls the purge pump and the purge valve by an engine condition and a vehicle speed.

17 Claims, 11 Drawing Sheets

(51) Int. Cl.
*F02M 35/10* (2006.01)
*F02M 26/04* (2016.01)
*F02M 26/12* (2016.01)
*F02M 26/17* (2016.01)
*F02D 41/14* (2006.01)
*G01M 15/09* (2006.01)
*F02M 35/024* (2006.01)

(52) U.S. Cl.
CPC ............... *F02D 2041/1433* (2013.01); *F02D 2200/101* (2013.01); *F02D 2200/501* (2013.01); *F02M 2025/0845* (2013.01)

(56) References Cited

U.S. PATENT DOCUMENTS

| | | | | |
|---|---|---|---|---|
| 2019/0353112 | A1* | 11/2019 | Kim | F02D 41/0042 |
| 2020/0149484 | A1* | 5/2020 | Geng | F02D 41/0032 |
| 2020/0271065 | A1* | 8/2020 | Ahn | F02M 25/0836 |

* cited by examiner

EVAPORATION GAS ACTIVE PURGE SYSTEM AND ACTIVE PURGE METHOD

CROSS-REFERENCE TO RELATED APPLICATION

The present application claims priority to Korean Patent Application No. 10-2018-0154405, filed on Dec. 4, 2018, the entire contents of which is incorporated herein for all purposes by this reference.

BACKGROUND OF THE DISCLOSURE

Field of the Disclosure

The present invention relates to an evaporation gas active purge system and an active purge method, and more particularly, to an evaporation gas active purge system and an active purge method, which nonlinearly control a flow rate of an evaporation gas supplied from a fuel tank to an intake pipe according to an engine condition and a vehicle speed.

Description of Related Art

A vehicle has a fuel tank in which fuel is stored. The fuel may be evaporated by changes in temperature and pressure inside the fuel tank. When an evaporation gas is continuously generated inside the fuel tank, there is the possibility for the internal pressure of the fuel tank to be higher than necessary. Furthermore, when the evaporation gas leaks from the fuel tank, it pollutes the atmosphere.

Figure 1:
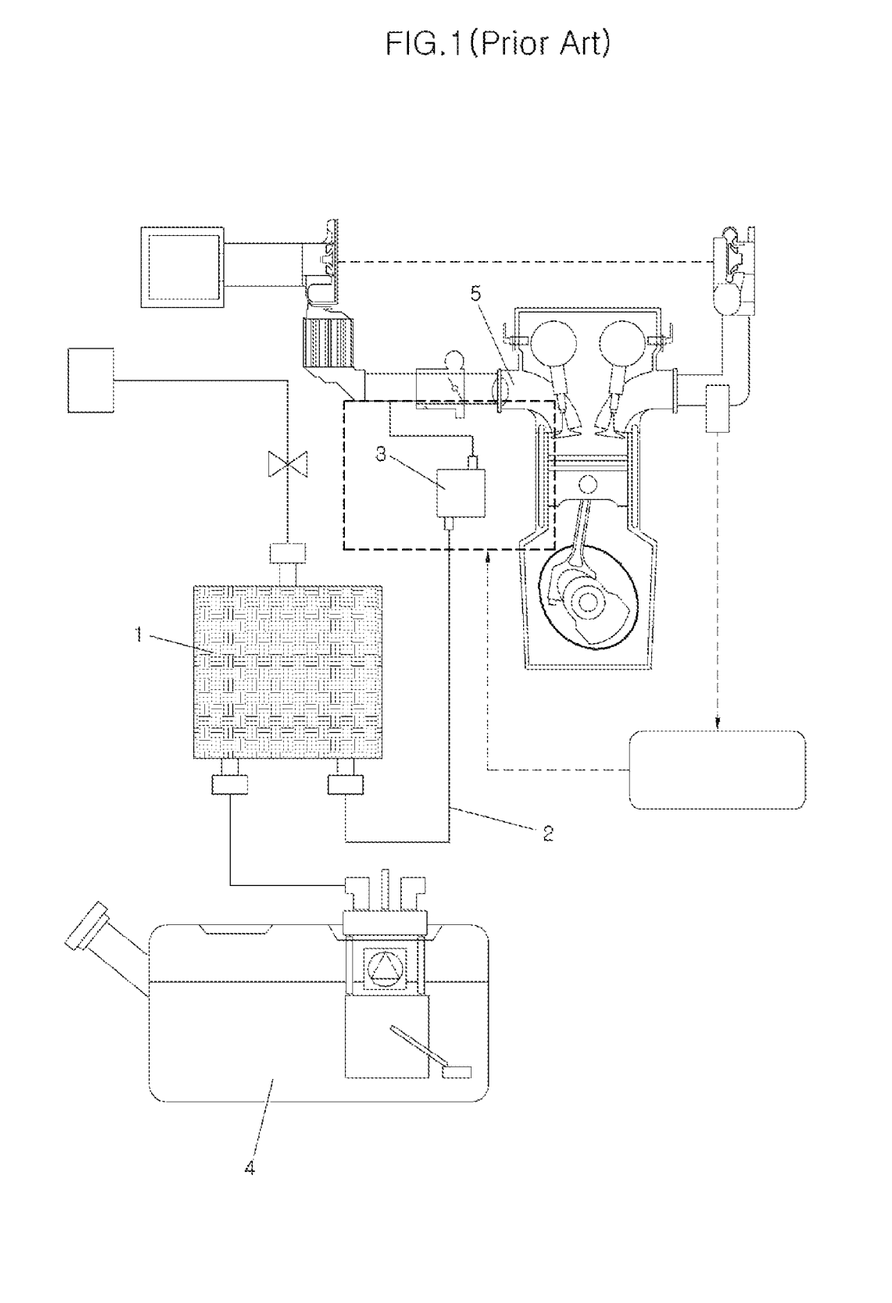
FIG. 1 is an exemplary diagram of a conventional purge system.

Therefore, a purge system as illustrated in FIG. 1 is provided in the vehicle. The purge system includes a canister 1, a purge line 2, and a purge valve 3. The activated carbon for adsorbing the evaporation gas is built in the canister 1. The purge line 2 connects a fuel tank 4, the canister 1, and an intake pipe 5. The purge valve 3 includes a solenoid valve. By opening the purge valve 3, a negative pressure of the intake pipe 5 is applied to the canister 1. The evaporation gas adsorbed in the canister 1 by the negative pressure of the intake pipe 5 is received into the intake pipe 5. The evaporation gas received into the intake pipe 5 is combusted together with the fuel in a combustion chamber.

However, when a turbocharger is applied to the vehicle, the internal to the intake pipe 5 may be equal to or greater than the atmospheric pressure. In the instant case, it is impossible to move the evaporation gas from the canister 1 to the intake pipe 5 conventionally.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an active purge system and an active purge method, which may supply an evaporation gas from a canister to an intake pipe even if a turbocharger is mounted on a vehicle.

Furthermore, various aspects of the present invention are directed to providing an active purge system and an active purge method, which may nonlinearly adjust a flow rate of the evaporation gas supplied from the canister to the intake pipe according to an engine condition and a vehicle traveling speed.

For achieving the objects, an evaporation gas active purge system of an exemplary embodiment of the present invention may include a purge line of connecting a canister for absorbing an evaporation gas of a fuel tank to an intake pipe, a purge pump mounted on the purge line, a purge valve mounted on the purge line to be disposed between the purge pump and the intake pipe, a pressure sensor mounted on the purge line to be disposed between the purge pump and the purge valve, and a control unit of receiving a signal from the pressure sensor, and transmitting an operating signal to the purge pump and the purge valve.

Furthermore, the control unit may receive a signal from a lambda sensor for detecting the amount of oxygen of a combusted gas.

Furthermore, the intake pipe may be disposed between an air cleaner and a turbocharger.

Furthermore, the intake pipe may have an inlet of an exhaust gas recirculation (EGR) gas disposed therein, and a connecting portion of the intake pipe and the purge line may be disposed at one side of the inlet of the EGR gas.

Furthermore, the pressure sensor may be mounted on the purge line to be disposed between the canister and the purge pump.

For achieving the objects, an evaporation gas active purge method of an exemplary embodiment of the present invention nonlinearly adjusts a flow rate of an evaporation gas supplied from a fuel tank to an intake pipe.

Furthermore, the flow rate of the evaporation gas may be adjusted by adjusting the RPM of the purge pump mounted to the purge line connected to the fuel tank and the intake pipe.

Furthermore, the flow rate of the evaporation gas may be adjusted by adjusting the opening amount of the purge valve provided to the purge line connected to the fuel tank and the intake pipe.

Furthermore, the flow rate of the evaporation gas may be adjusted by adjusting the RPM of the purge pump and the opening amount of the purge valve provided to the purge line connected to the fuel tank and the intake pipe.

Furthermore, based on the diffusion model of the EGR gas supplied to the intake pipe, the diffusion shape of the evaporation gas received into the intake manifold from the intake pipe and the manifold supply flow rate of the evaporation gas received into the intake manifold may be determined.

Furthermore, an operation of the purge pump and the purge valve may be controlled by the control unit of receiving the engine condition and the vehicle speed, and the control unit may operate the purge pump and the purge valve so that the flow rate of the evaporation gas becomes a target purge flow rate.

Furthermore, the control unit may operate the purge pump at predetermined one or more operating RPMs, and operate the purge valve to have predetermined one or more opening amounts according to the operating RPM of the purge pump to achieve the target purge flow rate.

Furthermore, the operating RPMs of the purge pump may be 15000, 30000, 45000, and 60000, and the opening amounts of the purge valve may be 100%, 70%, 50%, and 30%.

Furthermore, the flow rate of the evaporation gas may be obtained from a graph in which the characteristics of the purge pump are illustrated, when the purge pump operates at a predetermined RPM.

Furthermore, the flow rate of the evaporation gas may be obtained based on a ratio of a predetermined value and the measured RPM of the purge pump from a graph in which the characteristics of the purge pump are illustrated, when the purge pump does not operate at a predetermined RPM.

Furthermore, a predetermined pressure difference may be determined so that a ratio 1, which is a ratio of current RPM of the purge pump and a predetermined RPM, and a ratio 2, which is a ratio of the measured pressure difference between the front end portion and the rear end portion of the purge pump and a predetermined pressure difference, are the same, the flow rate of the evaporation gas at the measured predetermined pressure difference may be obtained, and the flow rate of the evaporation gas may be determined so that a ratio 3, which is a ratio of the flow rate of the evaporation gas to be determined and the obtained flow rate of the evaporation gas, is equal to the ratio 1.

Furthermore, the flow rate of the evaporation gas may be adjusted so that a mixing ratio of the fuel and the intake air supplied to a combustion chamber connected to the intake pipe becomes a theoretical fuel-air ratio.

For achieving the objects, a method for operating the evaporation gas active purge system of an exemplary embodiment of the present invention may include obtaining the concentration of the evaporation gas which is present between the purge pump and the purge valve in the purge line and the pressure difference between the front end portion and the rear end portion of the purge pump, determining a target purge amount considering an engine condition, a vehicle speed, and an operating state of a fuel supply system, operating the purge pump at predetermined one or more operating RPMs, and operating the purge valve to have predetermined one or more opening amounts according to the operating RPM of the purge pump so that the flow rate of the evaporation gas flowing from the purge line to the intake pipe becomes a target purge flow rate, determining a purge fuel amount received into a combustion chamber by the flow of the evaporation gas, and compensating the purge fuel amount considering the environment in which a vehicle travels.

Furthermore, before the obtaining the concentration of the evaporation gas and the pressure difference between the front end portion and the rear end portion of the purge pump, generating a pressure, which operates the purge pump, and maintains the state where the purge valve has been locked, may be performed.

Furthermore, the obtaining the concentration of the evaporation gas and the pressure difference between the front end portion and the rear end portion of the purge pump may determine the fuel supply amount of the fuel supply system, and the amount of fresh air drawn in through the intake pipe to obtain the target purge amount.

Furthermore, in the determining the purge fuel amount received into the combustion chamber, the purge fuel amount may be determined considering a change in the evaporation gas concentration according to the temperature and the altitude of the peripheral in which a vehicle travels, and the environment in which the vehicle travels.

According to the active purge system and the active purge method of an exemplary embodiment of the present invention configured as described above, it is possible to pressurize the evaporation gas by an operation of the purge pump, moving the evaporation gas from the canister to the intake pipe even if the negative pressure is not formed inside the intake pipe.

Furthermore, it is possible to nonlinearly adjust a flow rate of the evaporation gas supplied from the canister to the intake pipe by controlling the RPM of the purge pump and the opening amount of the purge valve.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an evaporation gas active purge system and an active purge method of an exemplary embodiment of the present invention will be described in detail with reference to the accompanying drawings.

Figure 2:
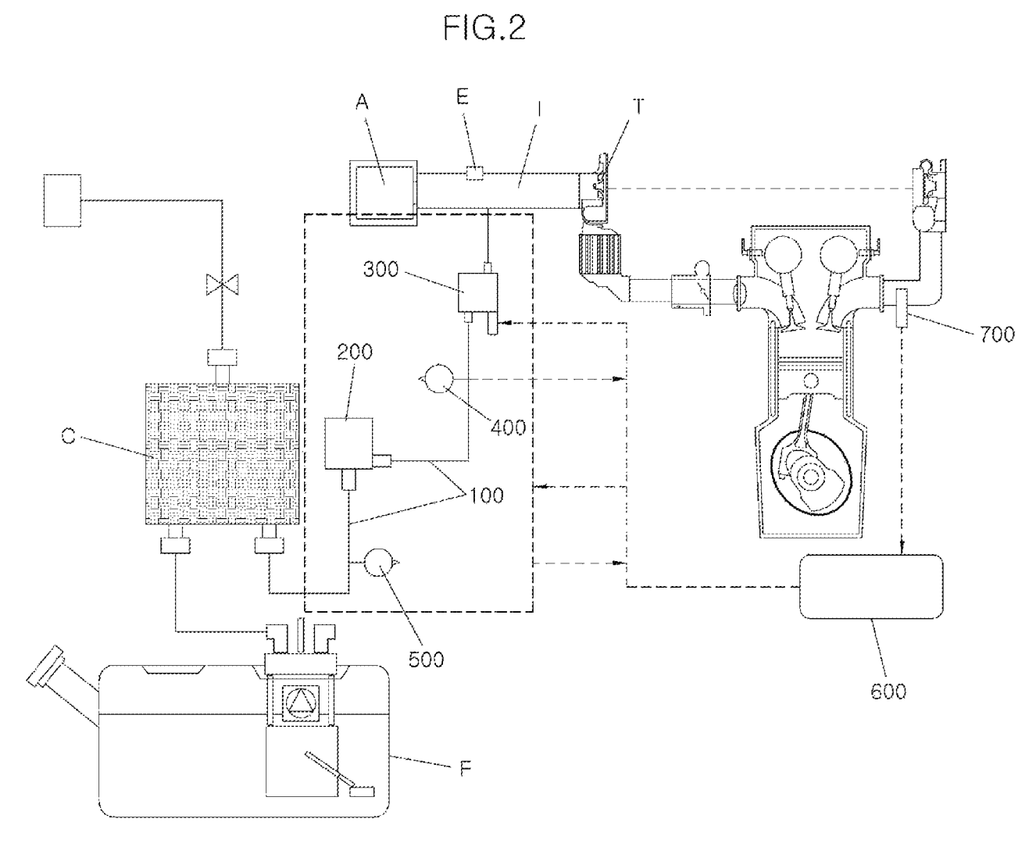
FIG. 2 is an exemplary diagram of an evaporation gas active purge system of an exemplary embodiment of the present invention.

As illustrated in FIG. 2, an evaporation gas active purge system of an exemplary embodiment of the present invention includes a purge line 100 for connecting a canister C for adsorbing the evaporation gas of a fuel tank F to an intake pipe I, a purge pump 200 mounted on the purge line 100, a purge valve 300 mounted on the purge line 100 to be disposed between the purge pump 200 and the intake pipe I, a first pressure sensor 400 mounted on the purge line 100 to be disposed between the purge pump 200 and the purge valve 300, and a control unit 600 for transmitting an operating signal to the purge pump 200 and the purge valve 300. A second pressure sensor 500 is mounted on the purge line 100 to be disposed between the canister C and the purge pump 200.

The canister C is connected to the atmosphere through a line. The line has a valve. The control unit 600 receives a signal from a lambda sensor 700 for detecting the amount of oxygen in a combustion gas. The control unit 600 obtains the air-fuel ratio of the mixed gas combusted in the combustion chamber based on the amount of oxygen detected from the lambda sensor 700. The control unit 600 transmits and receives a signal to and from a fuel supply system from supplying fuel to the combustion chamber.

The intake pipe I is disposed between an air cleaner A and a turbocharger T. An intercooler is provided between the turbocharger T and an intake manifold. An inlet E into which an EGR gas is injected is disposed in the intake pipe I. A connecting portion of the intake pipe I and the purge line 100 is disposed at one side of the inlet E of the EGR gas.

The purge line 100 has the purge pump 200, the purge valve 300, the first pressure sensor 400, the second pressure sensor 500, and a flowmeter sensor. The first pressure sensor 400 and the second pressure sensor 500 detect the pressures of the front end portion and the rear end portion of the purge pump 200 to continuously transmit them to the control unit 600. The flowmeter sensor is disposed between the purge valve 300 and the intake pipe I. The flowmeter sensor continuously detects the amount of the evaporation gas flowing from the purge line 100 to the intake pipe I to transmit it to the control unit 600.

The control unit 600 synthesizes the signals received from the fuel supply system, the lambda sensor 700, the first pressure sensor 400, the second pressure sensor 500, and the flowmeter sensor to adjust the RPM of the purge pump 200 and the opening amount of the purge valve 300 so that the evaporation gas flowing from the purge line 100 to the intake pipe I becomes a target purge flow rate. The fuel supply system transmits an engine condition, a vehicle speed, the injection amount of current fuel, and the like to the control unit 600.

Since the control unit 600 controls an operation of the purge pump 200 and the purge valve 300 based on the information detected by the various sensors to adjust the amount of the evaporation gas flowing from the purge line 100 to the intake pipe I, a flow rate of the evaporation gas supplied from the canister C to the intake pipe I is adjusted nonlinearly.

The active purge system of an exemplary embodiment of the present invention configured as described above is operated to obtain the graphs illustrated in FIGS. 3 to 7.

Figure 3:
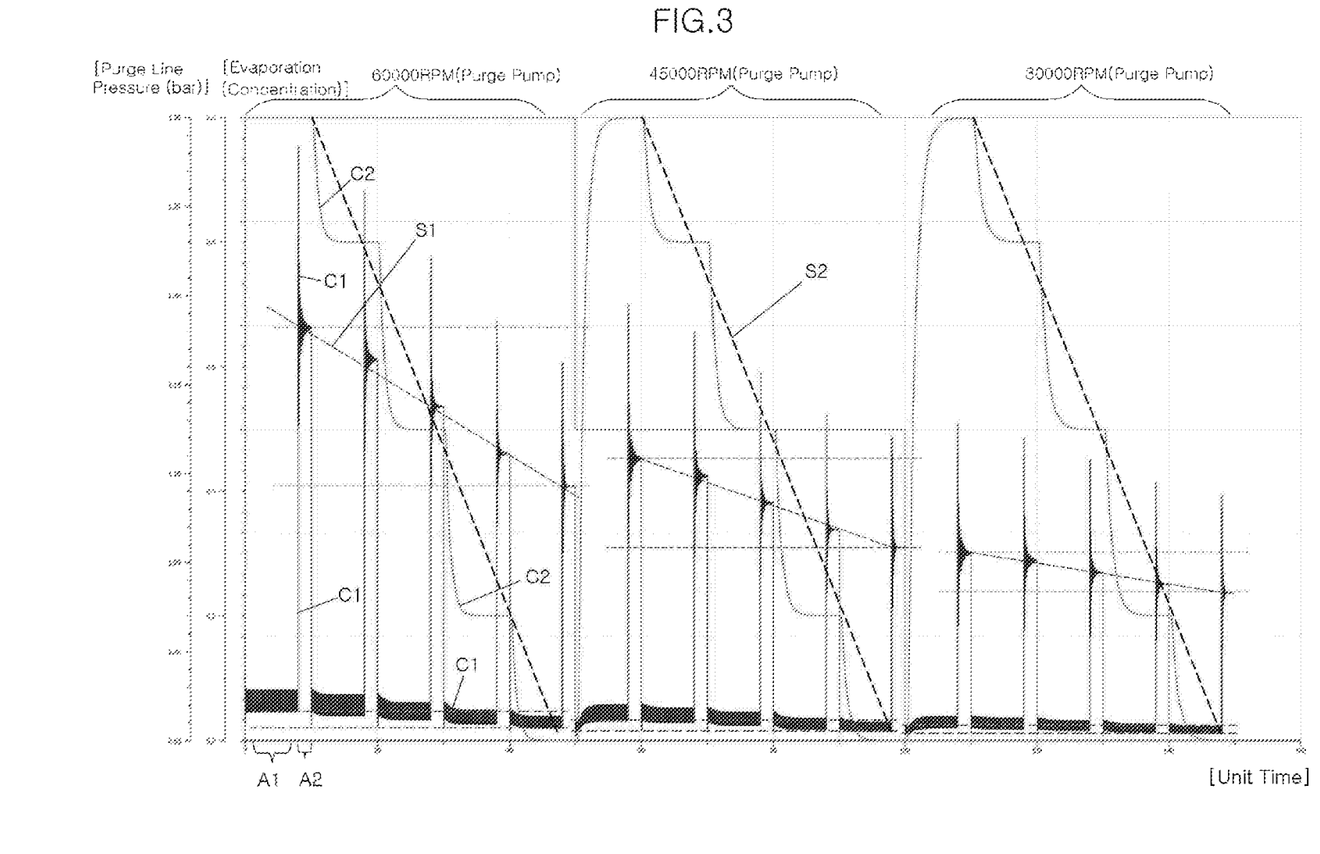
FIG. 3 is a graph illustrating the state of a purge line when a purge pump and a purge valve are opened.

FIG. 3 illustrates as a graph a pressure C1 and an evaporation gas concentration C2 between the purge pump 200 and the purge valve 300 in the purge line 100, when maintaining the RPM of the purge pump 200 at 60000, 45000, and 30000 for a unit time, then sequentially changing it, and closing and opening the purge valve 300 repeatedly at regular intervals by a plurality of times.

While the purge pump 200 is maintained at 60000, 45000, and 30000 RPM, the pressure C1 maintains a relatively low state (A1 section) when the purge valve 300 is opened, and when the purge valve 300 is closed, it maintains a relatively high state (A2 section). The evaporation gas concentration C2 reduces greatly when the purge valve 300 is kept open, and maintains the state when the purge valve 300 is closed.

It is estimated that both the pressure C1 and the evaporation gas concentration C2 are linearly reduced as an interval time of the opening and closing of the purge valve 300 becomes smaller.

As the rotation of the purge pump 200 is maintained at a small number of RPMs, the degree of a change in the pressure C1 according to the repetitive opening and closing of the purge valve 300 is small (see S1). Even if the RPM of the purge pump 200 is maintained at different RPMs from each other, the degree of a change in the evaporation gas concentration C2 according to the opening and closing of the purge valve 300 is constant (see S2).

As a result, as the purge valve 300 is opened or closed while the purge pump 200 maintains the same RPM, the tendency of changes of the pressure C1 and the evaporation gas concentration C2 may be determined linearly. Therefore, the evaporation gas of appropriate concentration may be supplied to the intake pipe I at an appropriate pressure according to the adjustment of the RPM of the purge pump 200 and the opening and closing operation of the purge valve 300.

Figure 4:
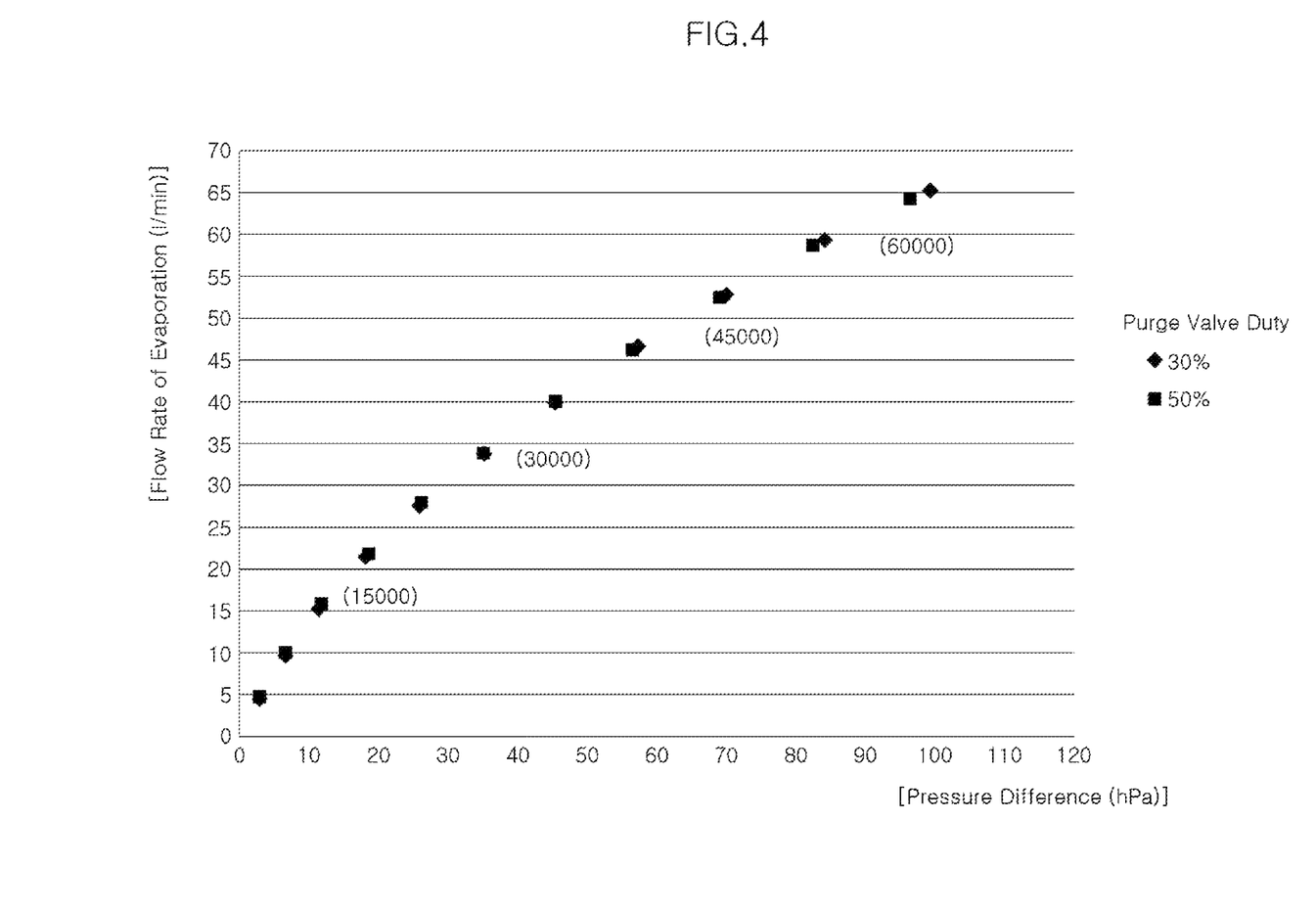
FIG. 4, FIG. 5 and FIG. 6 are graphs illustrating a flow rate of the evaporation gas according to an operation of the purge pump.
Figure 5:
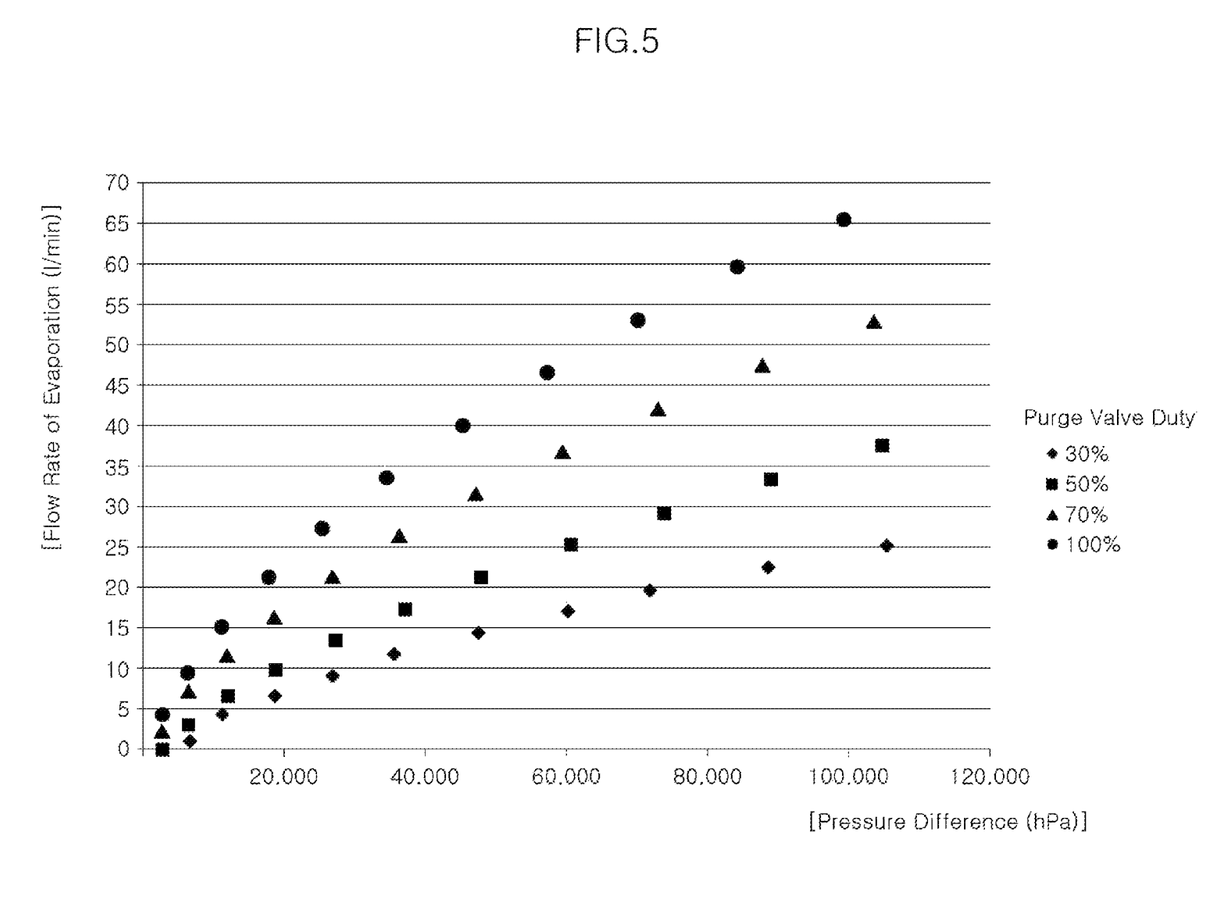
Figure 6:
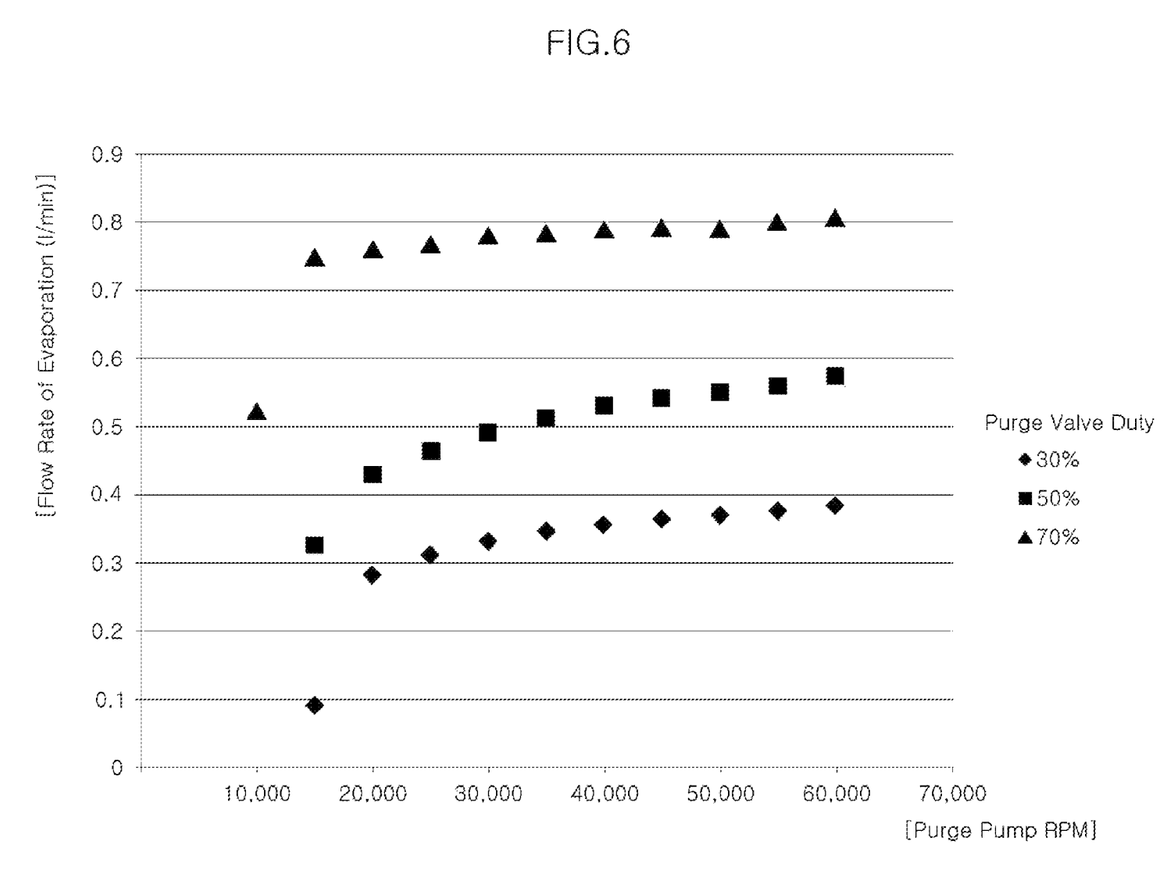

FIG. 4, FIG. 5 and FIG. 6 are graphs illustrating a flow rate of the evaporation gas according to an operation of the purge pump 200. The X-axis in FIG. 4 is a pressure difference between the front end portion and the rear end portion of the purge pump 200, and the Y-axis therein is a flow rate of the evaporation gas. As the RPM of the purge pump 200 increases from 15000 to 60000 and the pressure difference between the front end portion and the rear end portion of the purge pump 200 increases, the flow rate of the evaporation gas increases. This increase may be linear.

The X-axis in FIG. 5 is a pressure difference between the front end portion and the rear end portion of the purge pump 200, and the Y-axis therein is a flow rate of the evaporation gas. The RPM of the purge pump 200 is kept constant, and the opening amount of the purge valve 300 is gradually changed from 30% to 100%. As the opening amount of the purge valve 300 gradually increases from 30% to 100%, the flow rate of the evaporation gas increases relative to the pressure difference between the front end portion and the rear end portion of the purge pump 200. The present increase may be linear.

The X-axis in FIG. 6 is the RPM of the purge pump 200, and the Y-axis therein is a flow ratio. As compared with the case where the opening amount of the purge valve 300 is 100%, when the RPM of the purge pump 200 becomes an adequate value or more, a constant flow ratio is maintained by each opening amount of the purge valve 300.

Therefore, it may be seen that the flow rate of the evaporation gas may be adjusted by adjusting the RPM of the purge pump 200 and adjusting the opening amount of the purge valve 300.

Meanwhile, the concentration value of the evaporation gas may be estimated through the following Equations 1 to 3, and the density may be determined from the concentration value. In Equation 1, f is a mass fraction, and Equation 2 assumes the concentration as the mass fraction. In Equation 3, P is the atmospheric pressure.

$$\rho = \Sigma \rho_i * f_i \qquad \text{Equation 1}$$

According to the Equation 1, the density of the evaporation gas injected into the intake pipe I from the purge line 100 is defined by a sum of the product of the density for each air/hydrocarbon by mass fraction when the evaporation gas is instantly injected into the intake pipe I by the operation of the purge valve 300 (volume/mass).

$$\rho_{bas} = \rho_{air} * \left(1 - \frac{const}{100}\right) + \rho_{HC} * \left(\frac{const}{100}\right) \quad \text{Equation 2}$$

According to the Equation 2, the density of the evaporation gas that has reached the intake manifold from the intake pipe I is defined by a sum of a value calculated by the product of the density and the mass fraction of the hydrocarbon injected into the intake pipe I and a value calculated by the product of the density and the mass fraction of the air injected into the intake pipe I.

$$\rho_{act} = \rho_{bas} * \frac{P}{1 \text{ atm}} * \frac{273.15}{(273.15 + temp)} \quad \text{Equation 3}$$

According to the Equation 3, the density of the evaporation gas that has reached the combustion chamber from the intake manifold is defined by the product of the density of the evaporation gas that has reached the intake manifold, a magnitude ratio of the current atmospheric pressure based on 1 atm, and a reciprocal of the magnitude ratio of the current atmospheric temperature based on an absolute temperature.

Since the flow rate of the evaporation gas can be adjusted through the adjustment of the RPM of the purge pump 200 and the opening amount of the purge valve 300, the concentration of the evaporation gas can be calculated from the density of the evaporation gas, the air, and the hydrocarbon calculated through the Equations 1 to 3.

In addition, the pressure of the evaporation gas concentrated in the purge line 100 immediately before the evaporation gas is injected into the intake pipe I can be known. Therefore, based on the Equations 1 to 3, a graph as illustrated in FIG. 7 may be obtained.

Figure 7:
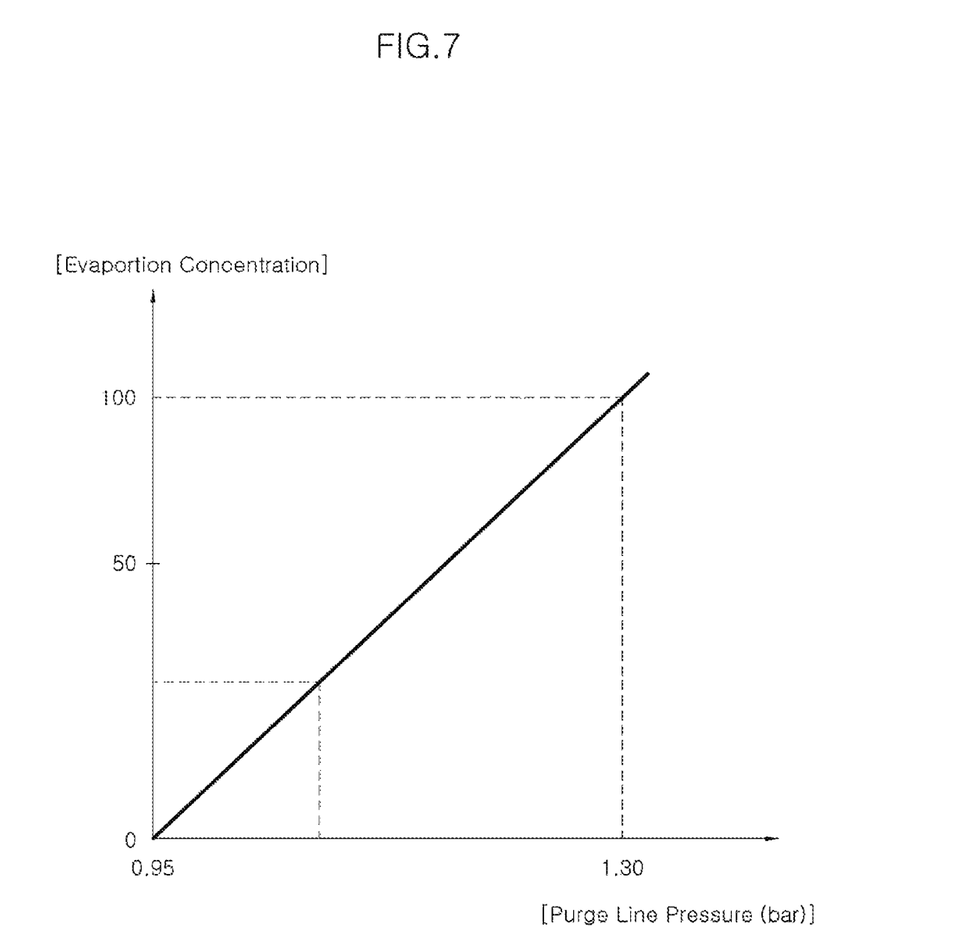
FIG. 7 is a graph illustrating the evaporation gas concentration inside the purge line when the purge pump and the purge valve are opened.

FIG. 7 is a graph illustrating the evaporation gas concentration between the purge pump 200 and the purge valve 300 in the purge line 100, when the purge pump 200 is continuously operated in the state where the purge valve 300 has been locked. As may be illustrated, the higher the pressure, the more linearly the evaporation gas concentration increases.

Meanwhile, the combustion chamber supply flow rate of the evaporation gas supplied from the intake manifold to the combustion chamber may be determined by use of the conventional purge delay diffusion model. However, when the active purging is applied, the diffusion model of the EGR gas supplied to the intake pipe I may be additionally applied to the conventional purge delay diffusion model with respect to the diffusion pattern of the evaporation gas received into the intake manifold from the intake pipe I and the manifold supply flow rate of the evaporation gas received into the intake manifold from the intake pipe I.

Through the following Equation 4, the amount of the evaporation gas finally reaching the combustion chamber from the intake manifold may be obtained.

$$PurgeFuelFlow + Q_{est} * \rho_{HC} \cdot \frac{P}{1 \text{ atm}} * \frac{273.15}{(273.15 + temp)} [Kg/m3] \quad \text{Equation 4}$$

As described above, in the active purge system of an exemplary embodiment of the present invention, the control unit 600 controls the operation of the purge pump 200 and the purge valve 300 based on the information detected by various sensors to nonlinearly adjust the amount of the evaporation gas flowing from the purge line 100 to the intake pipe I.

The control unit 600 may control the operation of the purge pump 200 and the purge valve 300 to linearly adjust the pressure and the evaporation gas concentration of the section between the purge pump 200 and the purge valve 300 in the purge line 100. The control unit 600 may control the operation of the purge pump 200 and the purge valve 300 to nonlinearly adjust the flow rate of the evaporation gas flowing from the purge line 100 to the intake pipe I. Ultimately, through the above-described Equations 1 to 4, the amount of the evaporation gas supplied to the combustion chamber may be obtained.

Figure 8:
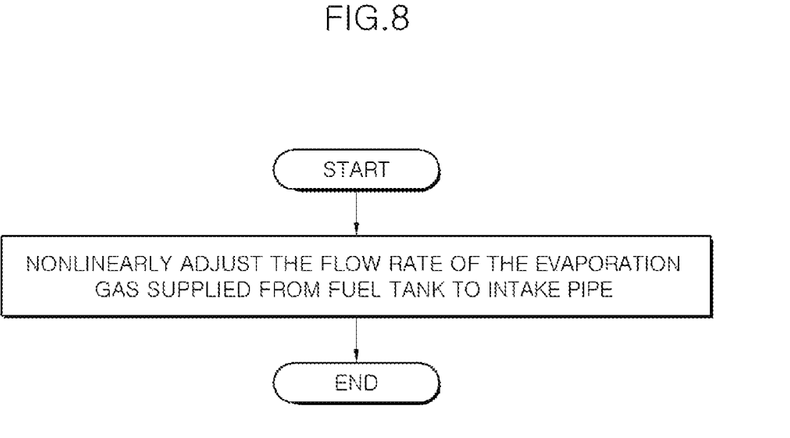
FIG. 8 is a flowchart of an evaporation gas active purge method of an exemplary embodiment of the present invention.

Various aspects of the present invention provide an exemplary embodiment of an active purge method as illustrated in FIG. 8 based on the fact that it is possible to nonlinearly adjust the flow rate of the evaporation gas supplied to the intake pipe I and to supply it to the combustion chamber by adjusting the operation of the purge valve 300 and the purge pump 200.

In the active purge method of an exemplary embodiment of the present invention, as illustrated in FIG. 8, the flow rate of the evaporation gas supplied from the fuel tank F to the intake pipe I is adjusted nonlinearly.

The flow rate of the evaporation gas is adjusted by adjusting the RPM of the purge pump 200 provided to the purge line 100 for connecting the fuel tank F and the intake pipe I and changing the opening amount of the purge valve 300 provided to the purge line 100.

The flow rate of the evaporation gas is detected in real time through a sensor provided to the purge line 100. The flow rate of the evaporation gas may also be provided in a table or a graph generated through the previously performed experiment.

The operation of the purge pump 200 and the purge valve 300 are controlled by the control unit 600 for receiving an engine condition and a vehicle speed. The control unit 600 operates the purge pump 200 and the purge valve 300 so that the flow rate of the evaporation gas becomes the target purge flow rate.

The target purge flow rate is a value previously obtained so that the mixing ratio of the fuel and the intake air finally supplied to the combustion chamber becomes a theoretical fuel-air ratio considering the engine condition, the vehicle speed, and the operating state of the fuel supply system.

For instance, the control unit 600 operates the purge pump 200 at predetermined one or more operating RPMs, and operates the purge valve 300 to have predetermined one or more opening amounts according to the operating RPM of the purge pump 200 so that the flow rate of the evaporation gas becomes the target purge flow rate. The operating RPMs of the purge pump 200 are 15000, 30000, 45000, and 60000, and the opening amount of the purge valve 300 is 100%, 70%, 50%, and 30%.

Figure 9:
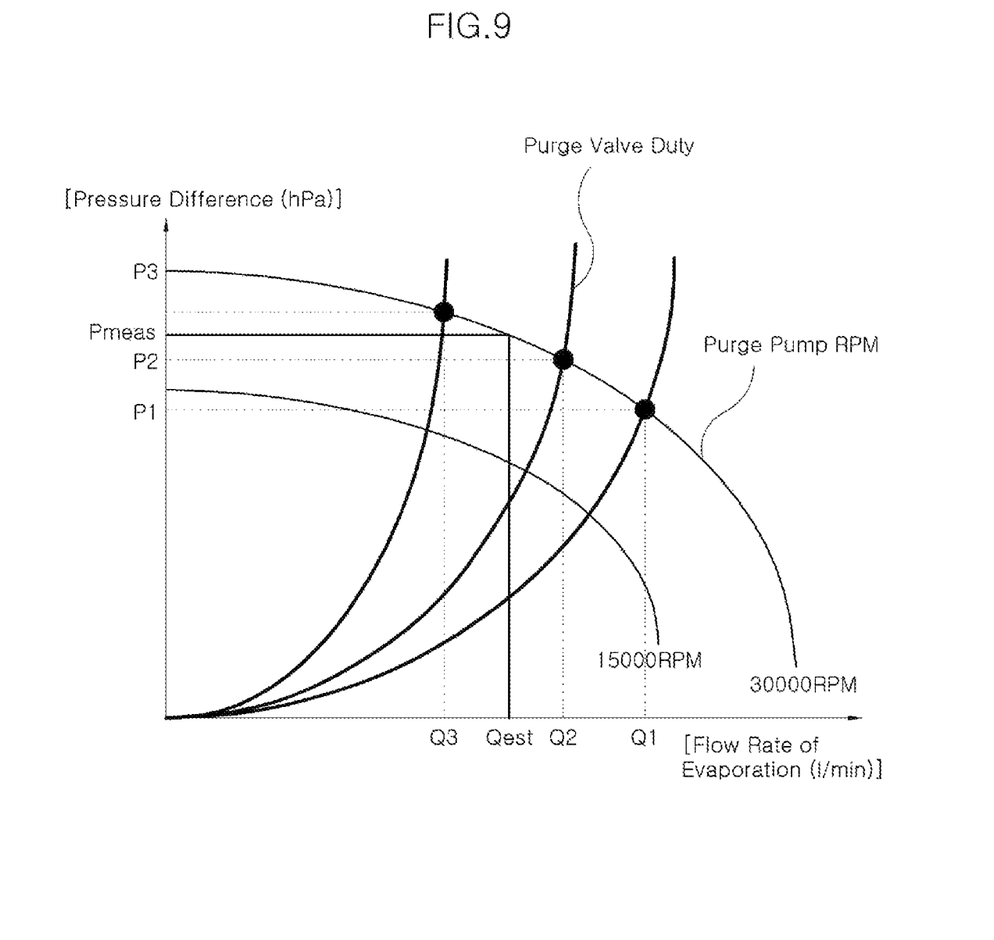
FIG. 9 and FIG. 10 are exemplary diagrams of graphs for obtaining a flow rate of the evaporation gas according to an operation of the purge pump.
Figure 10:
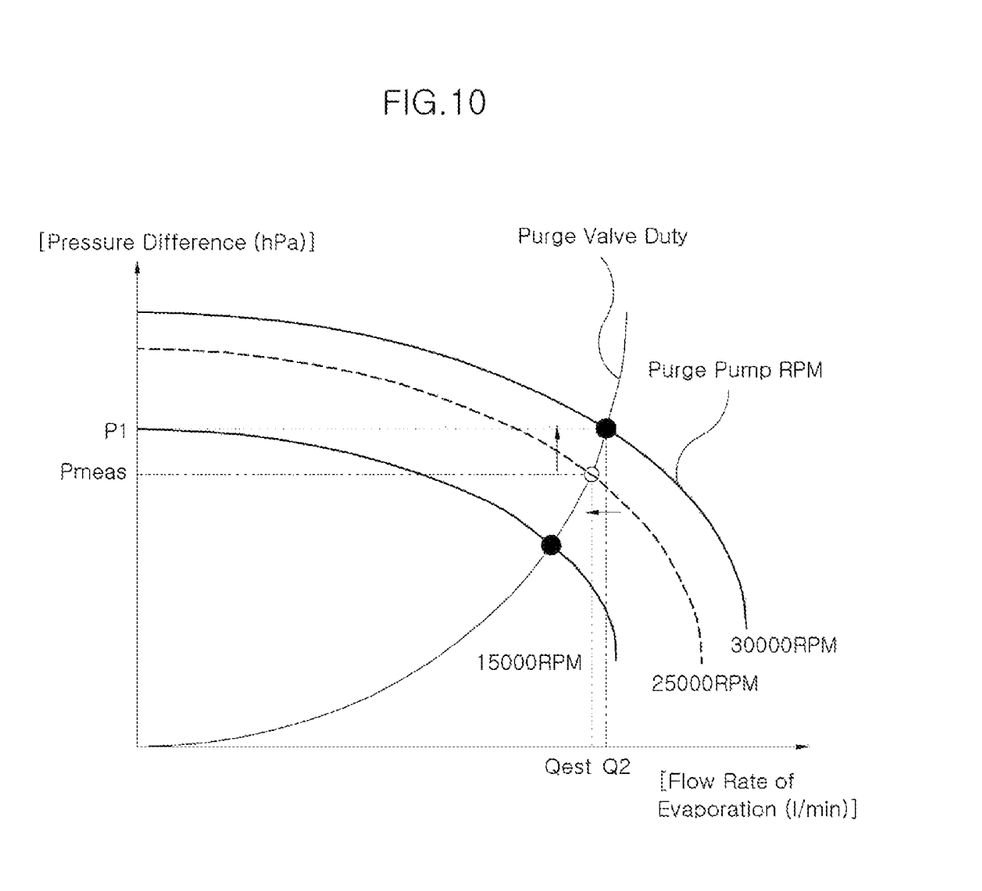

FIG. 9 and FIG. 10 illustrate the characteristic graphs of the purge pump 200. The X-axis is a flow rate, and the Y-axis is a pressure difference between the front end portion and the rear end portion of the purge pump 200. As illustrated in FIG. 9, when the purge pump 200 operates at a predetermined RPM and knows the pressure difference between the front end portion and the rear end portion of the purge pump 200, the flow rate of the evaporation gas received into the intake pipe I from the purge line 100 may be obtained from the graph previously prepared.

As illustrated in FIG. 10, when the purge pump 200 may not operate at the predetermined RPM, an estimated pressure difference is determined so that a ratio 1, which is a ratio of the measured RPM of the purge pump 200 and the predetermined RPM, and a ratio 2, which is a ratio of the measured pressure difference and the estimated pressure difference, are the same.

From the characteristic graph of the purge pump 200, an estimated flow rate, which is a flow rate of the evaporation gas at the estimated pressure difference, is obtained. A flow rate of the evaporation gas is determined so that a ratio 3, which is a ratio of the flow rate of the evaporation gas to be determined and the estimated flow rate, is equal to the ratio 1.

The determined flow rate of the evaporation gas is compared with the target purge flow rate. When the determined flow rate of the evaporation gas is not the target purge flow rate, the opening amount of the purge valve 300 is adjusted to increase or decrease the evaporation gas concentration.

Figure 11:
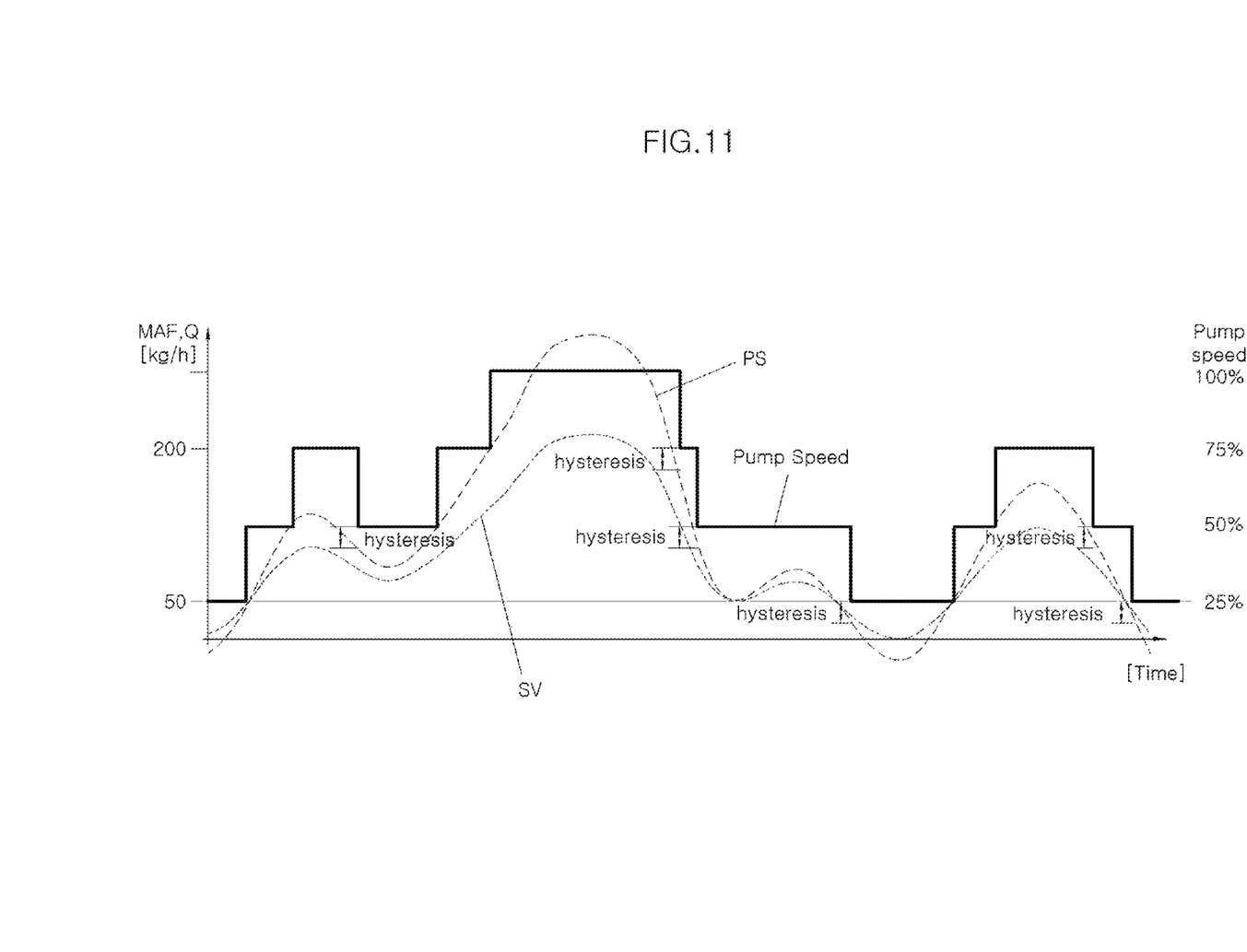
FIG. 11 is a graph illustrating the RPM of the purge pump, the flow rate of the evaporation gas, and the opening amount of the purge valve.

Referring to FIG. 11, a flow rate Q of the evaporation gas of when the RPM of the purge pump 200 may be appropriately controlled (PS) and when the amount of the evaporation gas flowing into the purge line 100 may be adjusted by the purge valve (SV) fluctuates nonlinearly. In each case, the flow rate Q of the evaporation gas does not coincide with each other. This may be a kind of hysteresis.

Figure 12:
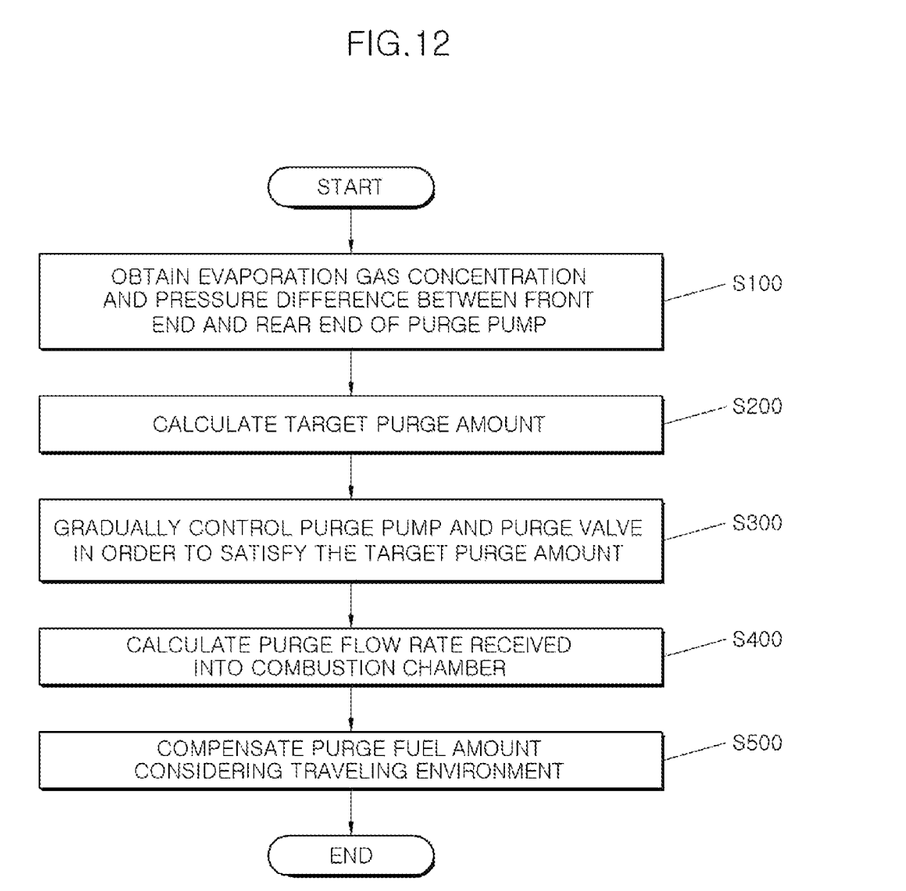
FIG. 12 is a flowchart of a method for operating the evaporation gas active purge system of an exemplary embodiment of the present invention.

Furthermore, various aspects of the present invention provide an exemplary embodiment of a method for operating the evaporation gas active purge system as illustrated in FIG. 12 to control the air-fuel ratio of a mixture received into the combustion chamber.

As illustrated in FIG. 12, a method for operating the evaporation gas active purge system of an exemplary embodiment of the present invention includes obtaining the concentration of the evaporation gas which is present between the purge pump 200 and the purge valve 300 in the purge line 100 and the pressure difference between the front end portion and the rear end portion of the purge pump 200 S100, determining a target purge amount considering an operating state of the fuel supply system S200, operating the purge pump 200 at predetermined one or more operating RPMs, and operating the purge valve 300 to have predetermined one or more opening amounts according to the operating RPM of the purge pump 200 so that the flow rate of the evaporation gas flowing from the purge line 100 to the intake pipe I becomes a target purge flow rate S300, determining the purge fuel amount received into the combustion chamber by the flow of the evaporation gas S400, and compensating the purge fuel amount considering the environment in which the vehicle is traveling S500.

In the obtaining the concentration of the evaporation gas and the pressure difference between the front end portion and the rear end portion of the purge pump 200 S100, the evaporation gas concentration may be detected through a concentration sensor provided to the purge line 100, and may be determined through the pressure of the section between the purge pump 200 and the purge valve 300 in the purge line 100 measured by the Equations 1 to 3 described above.

Before the obtaining the concentration of the evaporation gas and the pressure difference between the front end portion and the rear end portion of the purge pump 200 S100, generating a pressure, which operates the purge pump 200, and maintains the state where the purge valve 300 has been locked, is performed. In the generating the pressure, the purge pump 200 operates at a predetermined RPM during a predetermined time.

The obtaining the concentration of the evaporation gas and the pressure difference between the front end portion and the rear end portion of the purge pump 200 S100 determines the fuel supply amount of the fuel supply system and the amount of fresh air drawn in through the intake pipe I to obtain the target purge amount. The fuel supply amount of the fuel supply system may be changed according to the RPM of the purge pump 200 and the opening amount of the purge valve 300 in the operating the purge pump 200 at one or more operating RPMs and operating the purge valve 300 to have predetermined one or more opening amounts according to the operating RPM of the purge pump 200 S300.

In the determining the purge fuel amount received into the combustion chamber S400, the purge fuel amount is determined considering the change in the evaporation gas concentration according to the temperature and the altitude of the periphery where the vehicle travels, and the environment in which the vehicle travels.

In the compensating the purge fuel amount S500, the purge fuel amount may be compensated by adjusting the flow rate of the evaporation gas flowing from the purge line 100 to the intake pipe I through the adjustment of the RPM of the purge pump 200 and the adjustment of the opening amount of the purge valve 300. Furthermore, the purge fuel amount may also be compensated by increasing or decreasing the fuel amount supplied to the combustion chamber through the fuel supply system.

Therefore, it is possible to satisfy the fuel-air ratio of the mixture combusted in the combustion chamber according to the traveling environment, the engine state, and the vehicle speed, even if the evaporation gas is supplied to the combustion chamber by the evaporation gas purging.

As described above, it is possible to obtain the amount of the evaporation gas supplied to the combustion chamber from the flow rate of the evaporation gas supplied from the purge line 100 to the intake pipe I.

Therefore, according to the active purge system and the active purge method of an exemplary embodiment of the present invention, it is possible to nonlinearly adjust the fuel amount supplied to the combustion chamber by the evaporation gas, it is possible to pressurize the evaporation gas by the operation of the purge pump 200, moving the evaporation gas from the canister C to the intake pipe I, even if the negative pressure is not formed inside the intake pipe I.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An evaporation gas active purge system, comprising:
a purge line for connecting a canister for absorbing an evaporation gas of a fuel tank to an intake pipe;
a purge pump mounted on the purge line;
a purge valve mounted on the purge line and positioned between the purge pump and the intake pipe;
a first pressure sensor mounted on the purge line and positioned between the purge pump and the purge valve; and
a control unit of receiving a signal from the first pressure sensor, and transmitting an operating signal to the purge pump and the purge valve,
wherein the control unit is configured to control the purge pump and the purge valve according to an engine driving condition and a vehicle speed, and
wherein a second pressure sensor is mounted on the purge line to be mounted between the canister and the purge pump.

2. The evaporation gas active purge system of claim 1, wherein the control unit receives a signal from a lambda sensor for detecting an amount of oxygen of a combusted gas.

3. The evaporation gas active purge system of claim 1, wherein the intake pipe is mounted between an air cleaner and a turbocharger.

4. The evaporation gas active purge system of claim 1, wherein the intake pipe has an inlet of an exhaust gas recirculation (EGR) gas mounted therein, and
wherein a connecting portion of the intake pipe and the purge line is mounted at a side of the inlet of the EGR gas.

5. A method for operating the evaporation gas active purge system of claim 1, the method including:
obtaining a concentration of the evaporation gas which is present between the purge pump and the purge valve in the purge line and a pressure difference between a front end portion and a rear end portion of the purge pump;
determining a target purge amount considering an engine condition, the vehicle speed, and an operating state of a fuel supply system;
operating the purge pump at predetermined one or more operating RPMs, and operating the purge valve to have predetermined one or more opening amounts according to the predetermined one or more operating RPMs of the purge pump so that a flow rate of the evaporation gas flowing from the purge line to the intake pipe becomes a target purge flow rate;
determining a purge fuel amount received into a combustion chamber by the flow of the evaporation gas; and
compensating the purge fuel amount considering an environment in which a vehicle travels.

6. The method of claim 5,
wherein before the obtaining the concentration of the evaporation gas and the pressure difference between the front end portion and the rear end portion of the purge pump, generating a pressure, which operates the purge pump and maintains a state where the purge valve has been locked, is performed.

7. The method of claim 5,
wherein the obtaining the concentration of the evaporation gas and the pressure difference between the front end portion and the rear end portion of the purge pump determines a fuel supply amount of the fuel supply system, and an amount of air drawn in through the intake pipe to obtain the target purge amount.

8. The method of claim 5,
wherein in the determining of the purge fuel amount received into the combustion chamber, the purge fuel amount is determined considering a change in the concentration of the evaporation gas according to a temperature and an altitude of a peripheral in which the vehicle travels, and an environment in which the vehicle travels.

9. An evaporation gas active purge method, comprising:
controlling a flow rate of an evaporation gas supplied from a fuel tank to an intake pipe by adjusting a purge pump and a purge valve by a control unit according to an engine condition, a vehicle speed and signals from a pressure sensor,
wherein the flow rate of the evaporation gas is adjusted by adjusting revolutions per minute (RPM) of the purge pump mounted to a purge line connected to the fuel tank and an intake pipe and an opening amount of the purge valve, and
wherein a purge delay diffusion model and a delay model of an exhaust gas recirculation (EGR) gas are applied for determining a manifold supply flow rate of the evaporation gas received into an intake manifold from the intake pipe.

10. The evaporation gas active purge method of claim 9,
wherein the flow rate of the evaporation gas is adjusted by adjusting the revolutions per minute (RPM) of the purge pump mounted to the purge line connected to the fuel tank and the intake pipe.

11. The evaporation gas active purge method of claim 9,
wherein the flow rate of the evaporation gas is adjusted by adjusting an opening amount of the purge valve provided to the purge line connected to the fuel tank and the intake pipe.

12. The evaporation gas active purge method of claim 9,
wherein an operation of the purge pump and the purge valve is configured to be controlled by the control unit of receiving the engine condition and the vehicle speed, and
wherein the control unit operates the purge pump and the purge valve so that the flow rate of the evaporation gas becomes a target purge flow rate.

13. The evaporation gas active purge method of claim 12,
wherein the control unit operates the purge pump at predetermined one or more operating RPMs, and operates the purge valve to have predetermined one or more opening amounts according to the predetermined one or more operating RPMs of the purge pump so that the flow rate of the evaporation gas becomes the target purge flow rate.

14. The evaporation gas active purge method of claim 13,
wherein the predetermined one or more operating RPMs of the purge pump are 15000, 30000, 45000, and 60000, and
wherein the predetermined one or more opening amounts according of the purge valve are 100%, 70%, 50%, and 30%.

15. The evaporation gas active purge method of claim 10, wherein the flow rate of the evaporation gas is obtained from a graph in which characteristics of the purge pump are illustrated, when the purge pump operates at a predetermined RPM.

16. The evaporation gas active purge method of claim 10, wherein the flow rate of the evaporation gas is obtained based on a ratio of a predetermined value and a measured RPM of the purge pump from a graph in which characteristics of the purge pump are illustrated, when the purge pump does not operate at a predetermined RPM.

17. The evaporation gas active purge method of claim 10, wherein the flow rate of the evaporation gas is adjusted so that a mixing ratio of a fuel and an intake air supplied to a combustion chamber connected to the intake pipe becomes a predetermined fuel-air ratio.

\* \* \* \* \*